United States Patent
Orvedahl

(10) Patent No.: US 11,588,412 B1
(45) Date of Patent: Feb. 21, 2023

(54) SYSTEMS, METHODS, AND RETROFIT KITS TO PROVIDE OUTPUT POWER WITH ASYNCHRONOUS GENERATOR SPEEDS

(71) Applicant: Illinois Tool Works Inc., Glenview, IL (US)

(72) Inventor: Travis Orvedahl, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/459,149

(22) Filed: Aug. 27, 2021

(51) Int. Cl.
  *H02M 5/458* (2006.01)
  *H02P 9/02* (2006.01)
(52) U.S. Cl.
  CPC .............. *H02M 5/458* (2013.01); *H02P 9/02* (2013.01)
(58) Field of Classification Search
  CPC .................................. H02P 9/02; H02M 5/458
  See application file for complete search history.

(56) References Cited

U.S. PATENT DOCUMENTS

| | | | |
|---|---|---|---|
| 8,525,492 B2 | 9/2013 | Peterson et al. | |
| 8,698,335 B2 | 4/2014 | Dai et al. | |
| 2019/0305692 A1* | 10/2019 | Allen, Jr. | ............ H02M 7/5387 |
| 2022/0255452 A1* | 8/2022 | Schmitt | ................ H02M 7/487 |

* cited by examiner

*Primary Examiner* — Sean Gugger
(74) *Attorney, Agent, or Firm* — McAndrews Held & Malloy, Ltd.

(57) ABSTRACT

An example power system for supplying AC output power to an AC load includes: a variable-speed generator configured to be driven by a prime mover, the generator comprising a first winding and a reference tap in the first winding; a rectifier configured to rectify an input voltage from the first winding to output a positive DC signal with respect to the reference tap and a negative DC signal with respect to the reference tap; a first boost converter configured to convert the positive DC signal to generate a positive DC bus voltage with respect to the reference tap; a second boost converter configured to convert the negative DC signal to generate a negative DC bus voltage with respect to the reference tap; and an inverter circuit configured to convert the positive DC bus voltage and the negative DC bus voltage to an AC output signal with respect to the reference tap.

20 Claims, 3 Drawing Sheets

SYSTEMS, METHODS, AND RETROFIT KITS TO PROVIDE OUTPUT POWER WITH ASYNCHRONOUS GENERATOR SPEEDS

BACKGROUND

This disclosure relates generally to welding systems and, more particularly, to systems, methods, and retrofit kits to provide output power with asynchronous generator speeds.

Engine-driven power systems provide power based on a desired load. When there is no or low load on the engine, the engine controller may reduce the engine speed to an idle speed or shut down the engine. Conventional generator systems that provide AC power at standard frequencies (e.g., 50 Hz, 60 Hz) rely on predetermined generator speeds based on the winding configuration. In such conventional generator systems, changes in the generator speed change the resulting AC output frequency, which can cause problems for attached electrical equipment.

SUMMARY

Systems, methods, and retrofit kits to provide output power with asynchronous generator speeds are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to identify similar or identical components.

DETAILED DESCRIPTION

Figure 1:
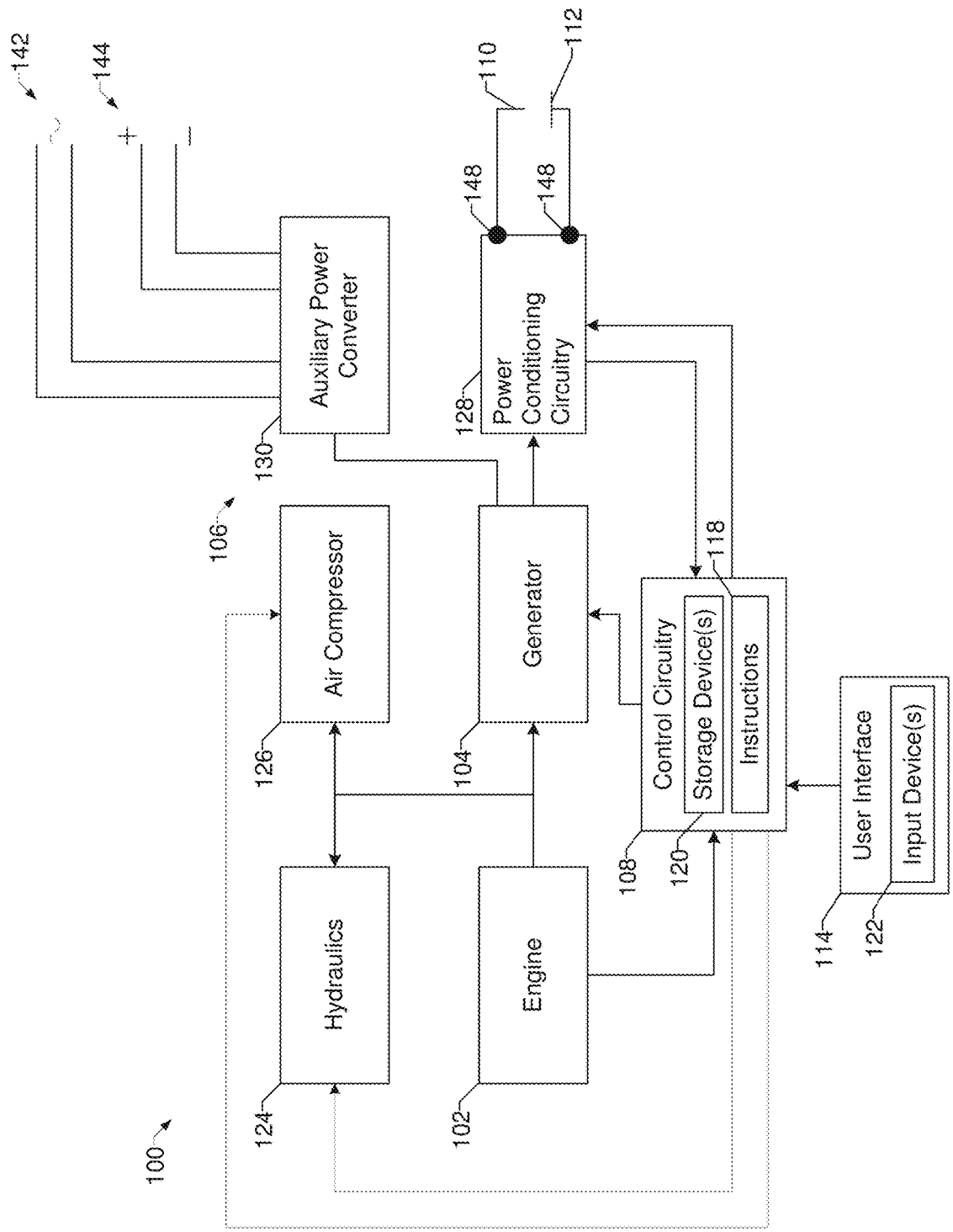
FIG. 1 is a schematic diagram of an example engine-driven power system including an example system to provide output power with asynchronous generator speeds, in accordance with aspects of this disclosure.

In conventional generator systems, to obtain AC output power at a given frequency (e.g., 50 Hz, 60 Hz, etc.), the generator is required to run at a designed speed (e.g., a synchronous speed) based on the windings. In some cases in which the generator may run at a first speed to improve performance of one subsystem (e.g., a welding output, a hydraulic output, a pneumatic output, etc.), the generator would require a separate winding designed to provide the desired output frequency at the first speed (e.g., an asynchronous speed).

As used herein, the terms "synchronous speed" and "asynchronous speed" are used with reference to the intended AC output frequency. As used herein, the term "auxiliary output power" refers to an electrical output that is separate from at least one other subsystem. An example of an auxiliary output power may include an 120 VAC or 240 VAC electrical output supplied by a same prime mover (e.g., an engine) and/or electrical source (e.g., a generator) as a welding or pneumatic output.

Disclosed example systems, methods, and retrofit kits provide for auxiliary AC output power to be provided by a generator operating at asynchronous speeds without a separate winding for the auxiliary AC power. In some disclosed examples, an auxiliary power converter is supplied by a generator winding having at least one reference (e.g., neutral) tap between the ends of the winding. The auxiliary power converter includes input rectifier, positive and negative boost converters that create two opposing polarity DC buses, and an inverter circuit that creates the AC output from the buses. The boost converters and the inverter circuit are referenced to the neutral reference tap of the generator winding. In some examples, the boost converters generate the positive and negative DC buses at respective voltages that are higher (e.g., further from the reference tap voltage) than the peak voltage of the AC output, and the inverter is implemented using a half bridge that creates the synchronous AC output by commutating or pulse width modulating half bridge.

In some examples, a peak output voltage, an output current, an input voltage, inductor current, and/or one or both bus voltages are monitored by control circuitry to control the boost converters and/or the inverter circuit.

Disclosed example power systems for supplying AC output power to an AC load include: a variable-speed generator configured to be driven by a prime mover, the generator comprising a first winding and a reference tap in the first winding; a rectifier configured to rectify an input voltage from the first winding to output a positive DC signal with respect to the reference tap and a negative DC signal with respect to the reference tap; a first boost converter configured to convert the positive DC signal to generate a positive DC bus voltage with respect to the reference tap; a second boost converter configured to convert the negative DC signal to generate a negative DC bus voltage with respect to the reference tap; and an inverter circuit configured to convert the positive DC bus voltage and the negative DC bus voltage to an AC output signal with respect to the reference tap.

Some example power systems further include an engine configured to supply mechanical power as the prime mover to the generator. Some example power systems further include a welding-type power supply configured to convert at least one of 1) the input voltage between the first winding and the reference tap, 2) the input voltage across the first winding, or 3) the AC output signal, to welding-type power.

In some example power systems, the inverter circuit includes a half bridge circuit coupled to the positive DC bus voltage and the negative DC bus voltage, the half bridge circuit configured to control the AC output signal based on pulse width modulating a first switch of the half bridge circuit coupled to the positive DC bus voltage and a second switch of the half bridge circuit coupled to the negative DC bus voltage. Some example power systems further include control circuitry configured to: control a speed of the generator; control the first boost converter to convert the positive DC signal to generate the positive DC bus voltage; control the second boost converter to convert the negative DC signal to generate the negative DC bus voltage; and control the inverter circuit to convert the positive DC bus voltage and the negative DC bus voltage to the AC output signal. In some examples, the control circuitry is configured to control the inverter circuit to control at least one of a frequency of the AC output signal or a voltage of the AC output signal. Some example power systems further include a current sensor configured to monitor an output current of the AC output signal, and wherein the control circuitry is configured to control at least one of the first boost converter, the second boost converter, or the inverter circuit based on the output current.

Some example power systems further include a first voltage sensor configured to monitor a peak output voltage of the AC output signal, and wherein the control circuitry is configured to control at least one of the first boost converter, the second boost converter, or the inverter circuit based on the peak output voltage of the AC output signal. Some example power systems further include a second voltage sensor configured to monitor at least one of the positive DC bus voltage or the negative DC bus voltage, and wherein the control circuitry is configured to control at least one of the first boost converter, the second boost converter, or the inverter circuit based on the at least one of the positive DC bus voltage or the negative DC bus voltage.

In some example power systems, the inverter circuit is configured to output the AC output signal to have a different frequency than the input voltage output by the generator for at least a range of generator speeds. In some example power systems, the inverter circuit is configured to output the AC output signal to have a rated frequency over a range of generator speeds. In some example power systems, Some example power systems further include a second inverter circuit configured to convert the positive DC bus voltage and the negative DC bus voltage to a second AC output signal with respect to the reference tap.

Disclosed example retrofit kits to configure a variable-speed generator to output a constant frequency and voltage, in which the retrofit kit includes: a rectifier having a first terminal configured to be connected to a first winding of the generator and a second terminal configured to be connected to a reference tap of the first winding, and configured to rectify an input voltage from the first winding to output a first positive DC signal with respect to the reference tap and a negative DC signal with respect to the reference tap; a first boost converter configured to convert the positive DC signal to generate a positive DC bus voltage with respect to the reference tap; a second boost converter configured to convert the first DC signal to generate a negative DC bus voltage with respect to the reference tap; and an inverter circuit configured to convert the positive DC bus voltage and the negative DC bus voltage to an AC output signal with respect to the reference tap.

Some example retrofit kits further include control circuitry configured to be connected to a control input of the generator, and configured to: control a speed of the generator; control the first boost converter to convert the positive DC signal to generate the positive DC bus voltage; control the second boost converter to convert the negative DC signal to generate the negative DC bus voltage; and control the inverter circuit to convert the positive DC bus voltage and the negative DC bus voltage to the AC output signal. In some example retrofit kits, the control circuitry is configured to control the inverter circuit to control at least one of a frequency of the AC output signal or a voltage of the AC output signal.

Some example retrofit kits further include a current sensor configured to monitor an output current of the AC output signal, and wherein the control circuitry is configured to control at least one of the first boost converter, the second boost converter, or the inverter circuit based on the output current. Some example retrofit kits further include a first voltage sensor configured to monitor a peak output voltage of the AC output signal, and wherein the control circuitry is configured to control at least one of the first boost converter, the second boost converter, or the inverter circuit based on the peak output voltage of the AC output signal.

Some example retrofit kits further include a second voltage sensor configured to monitor at least one of the positive DC bus voltage or the negative DC bus voltage, and wherein the control circuitry is configured to control at least one of the first boost converter, the second boost converter, or the inverter circuit based on the at least one of the positive DC bus voltage or the negative DC bus voltage. In some example retrofit kits, the inverter circuit is configured to output the AC output signal to have a rated frequency over a range of generator speeds.

Disclosed example methods to supply AC output power to an AC load involve: driving a variable-speed generator at a first speed; rectifying an input voltage between a first winding of the generator and a reference tap of the first winding to output a first DC signal; converting, via a first boost converter, the positive DC signal to generate a positive DC bus voltage with respect to the reference tap; converting, via a second boost converter, a negative DC signal to generate a negative DC bus voltage with respect to the reference tap; and converting, via an inverter circuit, the positive DC bus voltage and the negative DC bus voltage to an AC output signal with respect to the reference tap.

The term "welding-type output," as used herein, refers to an output suitable for welding, plasma cutting, induction heating, CAC-A and/or hot wire welding/preheating (including laser welding and laser cladding).

FIG. 1 is a schematic diagram of an example engine-driven power system 100 including an example system to provide output power with asynchronous generator speeds. The example engine-driven power system 100 includes an engine 102, a generator 104, power conditioning circuitry 106, and control circuitry 108.

The example engine 102 is a gas-powered engine, and is mechanically coupled or linked to a rotor of the generator 104. The engine 102 is controllable to operate at multiple speeds, such as an idle (e.g., no or minimal load speed) and a maximum speed (e.g., the maximum rated power of the engine 102). The engine speed may be increased and/or decreased based on the load. The generator 104 generates output power based on the mechanical input from the engine 102. In some examples, the generator 104 is implemented using a high-output alternator. Collectively, the engine 102 and the generator 104 provide mechanical power and/or electrical power to power subsystems. In other examples, the generator 104 may be powered by a different prime mover than the engine 102, such as a diesel or other fuel-powered combustion engine, a hydraulic motor, a pneumatic motor, and/or any other type of prime mover.

The example power system 100 includes power subsystems such as power conditioning circuitry 106, a hydraulic system 124 configured to output hydraulic power, and/or an air compressor 126 configured to output pneumatic power. The example hydraulic system 124 and the air compressor 126 may be powered by mechanical power from the engine 102 and/or by electrical power from the generator 104. In some examples, either or both of the hydraulic system 124 and the air compressor 126 are omitted, or other subsystems may be included.

The example power conditioning circuitry 106 may include one or more power subsystems, such as a welding-type power supply 128 configured to output welding-type power, and an auxiliary power converter 130 configured to output AC power and, in some examples, DC power. Each of the welding-type power supply 128 and the auxiliary power converter 130 receive AC input power from the generator 104.

The example engine 102 and generator 104 may be configured to operate at multiple (e.g., variable) operating speeds and/or idle speeds. Additionally or alternatively, the engine 102 and generator 104 may be configured to operate at asynchronous speeds relative to an output frequency of the AC electrical output by the auxiliary power converter 130.

The welding-type power supply 128 converts output power from the generator 104 to welding-type power based on a commanded welding-type output. The welding-type power supply 128 provides current at a desired voltage to an electrode 110 and a workpiece 112 via output terminals 148 to perform a welding-type operation. The welding-type power supply 128 may include any type of welding circuitry, such as a switched-mode power supply, a boost-buck style converter, a forward converter, and/or any other type of topology. The welding-type power supply 128 may include a direct connection from a power circuit to the output (such as to the weld studs), and/or an indirect connection through power processing circuitry such as filters, converters, transformers, rectifiers, etc.

The auxiliary power converter 130 converts output power from the generator 104 (e.g., via the intermediate voltage bus 140) to AC power (e.g., 120 VAC, 240 VAC, 50 Hz, 60 Hz, etc.) and/or DC power (e.g., 12 VDC, 24 VDC, battery charging power, etc.). The auxiliary power converter 130 outputs one or more AC power outputs 142 (e.g., AC outlets or receptacles) and/or one or more DC power outputs 144 (e.g., DC outlets or receptacle). An example implementation of the auxiliary power converter 130 is described below with reference to FIG. 2.

The power system 100 enables multiple ones of the power subsystems (e.g., the power conditioning circuitry 106, the hydraulic system 124, the air compressor 126, the welding-type power supply 128, the auxiliary power converter 130, the vehicle power subsystem 132, the external power supply subsystem 136, etc.) to be operated simultaneously.

A user interface 114 enables selection of a commanded power level or welding-type output, such as a current or voltage level to be used for welding-type operations, such as via one or more input device(s) 122. Example input devices may include selector switches, knobs, a touchscreen, buttons, a mouse, a keyboard or keypad, and/or any other type of input device. The user interface 114 additionally or alternatively enables selection of one or more speeds for the engine 102 (e.g., in RPM), such as an idle engine speed and/or engine speed under load.

The example control circuitry 108 controls the welding-type power supply 128 and the auxiliary power converter 130 to control the respective outputs. For example, as described in more detail below, the control circuitry 108 may control switching devices of the auxiliary power converter 130 based on voltage and/or current feedback to control the AC power output 142 of the auxiliary power converter 130. In some examples, the control circuitry 108 also controls the engine 102 and/or the generator 104 to control the speed of the generator 104 and/or the output AC signal from the generator 104.

The control circuitry 108 may include digital and/or analog circuitry, discrete or integrated circuitry, microprocessors, digital signal processors (DSPs), field programmable gate arrays (FPGAs), and/or any other type of logic circuits. The example control circuitry 108 may be implemented using any combination of software, hardware, and/or firmware. The control circuitry 108 executes machine readable instructions 118 which may be stored on one or more machine readable storage device(s) 120 such as volatile and/or non-volatile memory, hard drives, solid state storage, and the like.

While the example power system 100 includes subsystems such as the power conditioning circuitry 106, the hydraulic system 124, the air compressor 126, the welding-type power supply 128, the auxiliary power converter 130, the vehicle power subsystem 132, the external power supply subsystem 136, the example power system 100 may be implemented as an engine-driven welding-type power supply that includes welding-type output and omits hydraulic output, pneumatic output, and one or more of the electrical outputs. For example, the power system 100 may be limited to the engine 102, the generator 104, the power conditioning circuitry 106, the control circuitry 108, and the user interface 114. In some examples, the power conditioning circuitry 106 may output one or more types of AC and/or DC, non-welding power (e.g., AC and/or DC auxiliary power, battery charging power, etc.).

Figure 2:
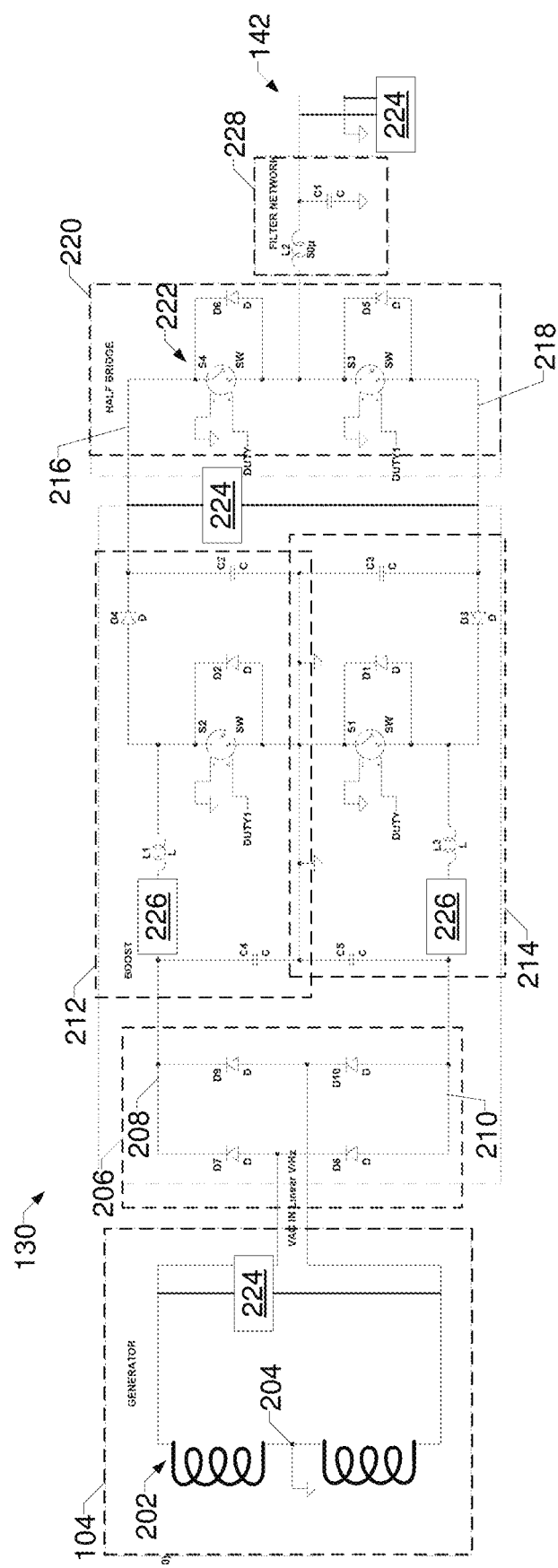
FIG. 2 is a circuit diagram of an example implementation of the auxiliary power converter of FIG. 1.

FIG. 2 is a circuit diagram of an example implementation of the auxiliary power converter 130 of FIG. 1, which is coupled to the generator 104 and is connected to the AC power output 142. The generator 104 may include additional windings as appropriate for the application, but a separate winding is not required for the auxiliary power converter 130 of FIG. 2 to generate a target AC output frequency over a range of engine 102 and/or generator 104 speeds.

In the example of FIG. 2, the generator 104 includes a first winding 202 and a reference tap 204. The example reference tap 204 provides a neutral reference (e.g., a center tap) to which the auxiliary power converter 130 and the AC power output 142 are referenced.

The auxiliary power converter 130 of FIG. 2 further includes a rectifier 206, which rectifies the AC input power from the generator winding 202 to output a positive DC signal 208 with respect to the reference tap 204 and a negative DC signal 210 with respect to the reference tap 204. The auxiliary power converter 130 further includes a positive boost converter 212 and a negative boost converter 214. The positive boost converter 212 converts the positive DC signal 208 generates a positive DC bus voltage 216 with respect to the reference tap 204. Similarly, the negative boost converter 214 converts the negative DC signal 210 generates a negative DC bus voltage 218 with respect to the reference tap 204.

The example auxiliary power converter 130 further includes an inverter circuit 220, which converts the positive DC bus voltage 216 and the negative DC bus voltage 218 to the AC power output 142 with respect to the reference tap 204. In the example of FIG. 2, the inverter circuit 220 includes a half bridge circuit 222. However, other topologies of inverter circuits may be used, such as a full-bridge circuit.

The positive boost converter 212, the negative boost converter 214, and/or the inverter circuit 220 (e.g., the half bridge 222) may be controlled by the control circuitry 108 of FIG. 1, and/or by separate control circuitry. For example, the control circuitry 108 controls the positive boost converter 212 by controlling a switching element of the positive boost converter 212 to convert the positive DC signal 208 to generate the positive DC bus voltage 216, and controls the negative boost converter 214 by controlling a switching element of the negative boost converter 214 to convert the negative DC signal 210 to generate the negative DC bus voltage 218. The control circuitry 108 may control the half bridge circuit 222 by pulse width modulating the a first switch of the half bridge circuit 222 coupled to the positive DC bus voltage, and a second switch of the half bridge circuit 222 coupled to the negative DC bus voltage to generate the AC power output 142, or by using a different control scheme.

The control circuitry 108 may receive feedback from one or more voltage sensors 224 and/or current sensors 226. For example, the voltage sensors 224 may measure one or more of the AC input voltage from the generator 104, the positive DC bus voltage 216, the negative DC bus voltage 218, and/or the AC power output 142. The example current sensors 226 may measure inductor currents (e.g., in the positive boost converter 212 or the negative boost converter 214). Based on changes in load, engine speed, and/or other variables determined by the feedback, the control circuitry 108 controls switching elements of the positive boost converter 212, the negative boost converter 214, and/or the inverter circuit 220.

The example auxiliary power converter 130 includes an output filter 228, which filters the output of the inverter circuit 220 prior to output at the AC power output 142.

While only one inverter circuit 220 is illustrated in FIG. 2 to provide the AC power output 142, the auxiliary power converter 130 may include multiple inverter circuits fed from the positive DC bus voltage 216 and the negative DC bus voltage 218 to provide multiple AC outputs that can be separately controlled based on the respective loads.

In some examples, the user interface 114 may be used to control the output frequency of the AC power output 142. For example, the user may select a geographic region having a particular standard AC frequency and/or may select an input frequency for a device which is to be connected to the AC output power. Based on the selected frequency, the control circuitry 108 controls the inverter circuit 220 to output the AC output power having the selected frequency.

In some examples, the rectifier 206, the positive boost converter 212, the negative boost converter 214, and the inverter circuit 220 may be supplied as a retrofit kit for connection to a generator winding having a center tap, to provide a desired AC output having a desired frequency using a generator configured to operator at an asynchronous generator speed and over a range of generator speeds. In some examples, the voltage sensor(s) 224, current sensor(s) 226, and/or filter network 228 may further be included in the retrofit kit.

To install the retrofit kit, input terminals of the rectifier 206 are connected to the end terminals of the existing generator winding 202, reference nodes of the positive boost converter 212, the negative boost converter 214, and the inverter circuit 220 are connected to the existing reference tap 204 (or which may be installed during the retrofit), and the output of the inverter circuit 220 is connected to an existing or included AC output terminal or plug. The retrofit kit may include control circuitry 108 to control the positive boost converter 212, the negative boost converter 214, and the inverter circuit 220, and/or the positive boost converter 212, the negative boost converter 214, and the inverter circuit 220 may include terminals for connection to an existing control circuit.

In some examples, the welding-type power supply 128 may receive input power from the auxiliary power converter 130 instead of directly from the generator 104. For example, the welding-type power supply 128 may be coupled across the terminals of the first winding 202, or between one terminal of the first winding 202 and the reference tap 204.

Figure 3:
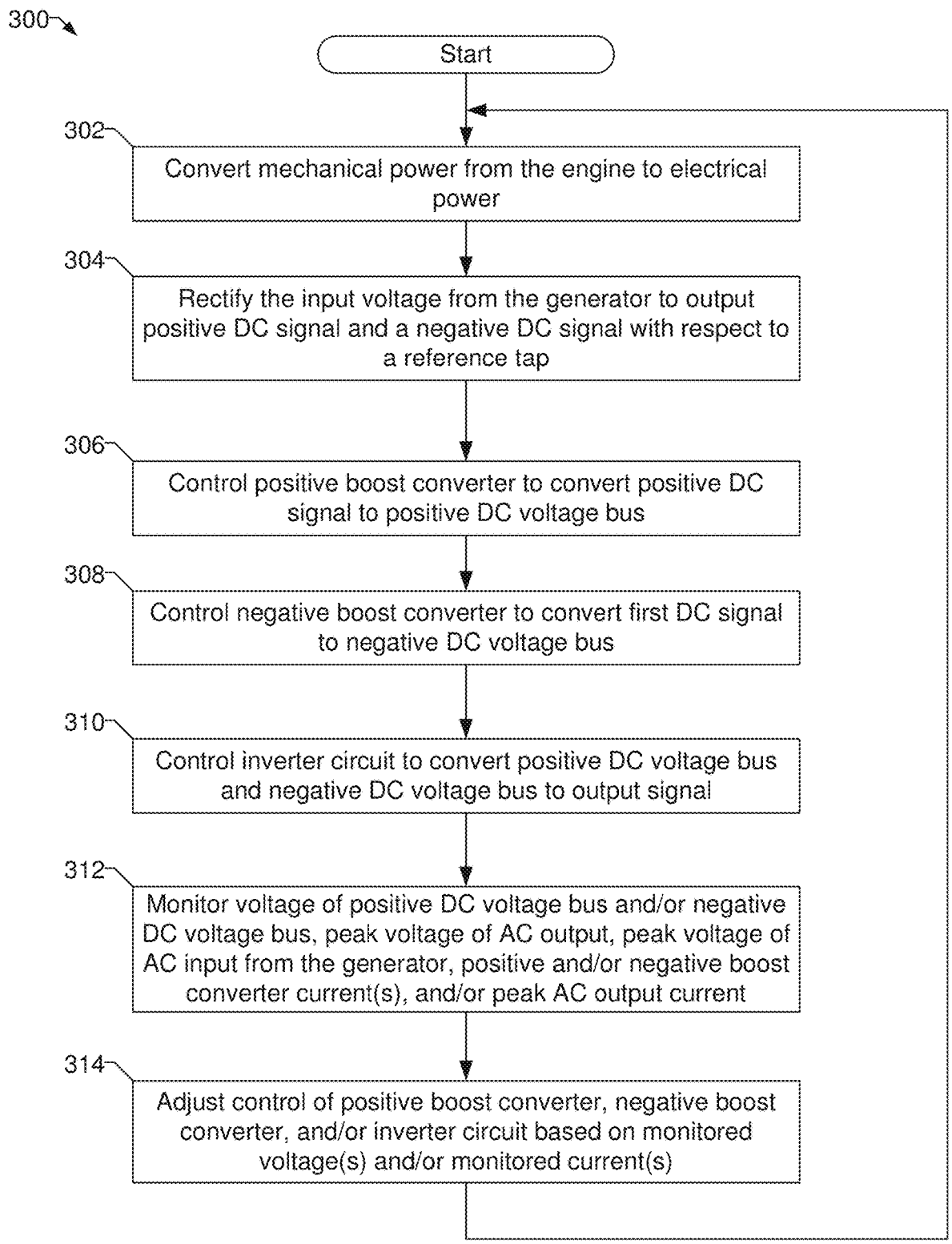
FIG. 3 is a flowchart representative of example machine readable instructions which may be executed to implement the control circuitry of FIG. 1 to control the auxiliary power converter to output auxiliary AC power.

FIG. 3 is a flowchart representative of example machine readable instructions 300 which may be executed to implement the control circuitry 108 of FIG. 1 to control the auxiliary power converter 130 to output auxiliary AC power.

At block 302, the generator 104 converts mechanical power from the engine 102 to electrical power. For example, a first winding 202 of the generator 104 generates an AC output based on the speed of the generator 104.

At block 304, the rectifier 206 rectifies the input voltage from the generator 104 to output a positive DC signal (e.g., the positive DC signal 208) and a negative DC signal (e.g., the positive DC signal 208) with respect to a reference tap of the first winding 202.

At block 306, the control circuitry 108 controls the positive boost converter 212 to convert the positive DC signal 208 to a positive DC bus voltage 216. At block 308, the control circuitry 108 controls the negative boost converter 214 to convert the negative DC signal 210 to a negative DC bus voltage 218.

At block 310, the control circuitry 108 controls the inverter circuit 220 (e.g., switching devices of the half bridge 222 of FIG. 2) to convert the positive DC bus voltage 216 and the negative DC bus voltage 218 to an AC power output 142. In some examples, the auxiliary power converter 130 also filters the output from the inverter circuit 220 via a filter circuit 228.

At block 312, the control circuitry 108 monitors (e.g., via voltage sensor(s) 224 and/or current sensor(s) 226) the voltage of the positive DC bus voltage 216 and/or the negative DC bus voltage 218, a peak voltage of the AC power output 142, a peak voltage of AC input from the generator 104, output and/or inductor current of the positive boost converter 212 and/or the negative boost converter 214, and/or a peak current of the AC power output 142. The control circuitry 108 may receive any one or more voltages and/or currents to determine adjustments to the control of the positive boost converter 212, the negative boost converter 214, and/or the inverter circuit 220.

At block 314, the control circuitry 108 adjusts control of the positive boost converter 212, the negative boost converter 214, and/or the inverter circuit 220 based on the monitored voltage(s) and/or monitored current(s) (from block 312). For example, the control circuitry 108 may adjust duty cycles of switching elements in one or more of the positive boost converter 212, the negative boost converter 214, and/or the inverter circuit 220 to provide the desired input and/or in response to the desired AC outputs. Control then returns to block 302 to continue providing the AC output power.

While the examples discussed above are described with reference to input power provided by a generator, the disclosed systems and methods may be used with other sources of input power to provide power with a desired AC frequency different than an input AC frequency.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be an processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system for supplying AC output power to an AC load, the power system comprising:
   a variable-speed generator configured to be driven by a prime mover, the generator comprising a first winding and a reference tap in the first winding;
   a rectifier configured to rectify an input voltage from the first winding to output a positive DC signal with respect to the reference tap and a negative DC signal with respect to the reference tap;
   a first boost converter configured to convert the positive DC signal to generate a positive DC bus voltage with respect to the reference tap;
   a second boost converter configured to convert the negative DC signal to generate a negative DC bus voltage with respect to the reference tap; and
   an inverter circuit configured to convert the positive DC bus voltage and the negative DC bus voltage to an AC output signal with respect to the reference tap.

2. The power system as defined in claim 1, further comprising an engine configured to supply mechanical power as the prime mover to the generator.

3. The power system as defined in claim 1, further comprising a welding-type power supply configured to convert at least one of 1) the input voltage between the first winding and the reference tap, 2) the input voltage across the first winding, or 3) the AC output signal, to welding-type power.

4. The power system as defined in claim 1, wherein the inverter circuit comprises a half bridge circuit coupled to the positive DC bus voltage and the negative DC bus voltage, the half bridge circuit configured to control the AC output signal based on pulse width modulating a first switch of the half bridge circuit coupled to the positive DC bus voltage and a second switch of the half bridge circuit coupled to the negative DC bus voltage.

5. The power system as defined in claim 1, further comprising control circuitry configured to:
   control a speed of the generator;
   control the first boost converter to convert the positive DC signal to generate the positive DC bus voltage;
   control the second boost converter to convert the negative DC signal to generate the negative DC bus voltage; and
   control the inverter circuit to convert the positive DC bus voltage and the negative DC bus voltage to the AC output signal.

6. The power system as defined in claim 5, wherein the control circuitry is configured to control the inverter circuit to control at least one of a frequency of the AC output signal or a voltage of the AC output signal.

7. The power system as defined in claim 5, further comprising a current sensor configured to monitor an output current of the AC output signal, and wherein the control circuitry is configured to control at least one of the first boost converter, the second boost converter, or the inverter circuit based on the output current.

8. The power system as defined in claim 5, further comprising a first voltage sensor configured to monitor a peak output voltage of the AC output signal, and wherein the control circuitry is configured to control at least one of the first boost converter, the second boost converter, or the inverter circuit based on the peak output voltage of the AC output signal.

9. The power system as defined in claim 8, further comprising a second voltage sensor configured to monitor at least one of the positive DC bus voltage or the negative DC bus voltage, and wherein the control circuitry is configured to control at least one of the first boost converter, the second boost converter, or the inverter circuit based on the at least one of the positive DC bus voltage or the negative DC bus voltage.

10. The power system as defined in claim 1, wherein the inverter circuit is configured to output the AC output signal to have a different frequency than the input voltage output by the generator for at least a range of generator speeds.

11. The power system as defined in claim 1, wherein the inverter circuit is configured to output the AC output signal to have a rated frequency over a range of generator speeds.

12. The power system as defined in claim 1, further comprising a second inverter circuit configured to convert the positive DC bus voltage and the negative DC bus voltage to a second AC output signal with respect to the reference tap.

13. A retrofit kit to configure a variable-speed generator to output a constant frequency and voltage, the retrofit kit comprising:
   a rectifier having a first terminal configured to be connected to a first winding of the generator and a second terminal configured to be connected to a reference tap of the first winding, and configured to rectify an input voltage from the first winding to output a first positive DC signal with respect to the reference tap and a negative DC signal with respect to the reference tap;
   a first boost converter configured to convert the positive DC signal to generate a positive DC bus voltage with respect to the reference tap;
   a second boost converter configured to convert the first DC signal to generate a negative DC bus voltage with respect to the reference tap; and
   an inverter circuit configured to convert the positive DC bus voltage and the negative DC bus voltage to an AC output signal with respect to the reference tap.

14. The retrofit kit as defined in claim 13, further comprising control circuitry configured to be connected to a control input of the generator, and configured to:
   control a speed of the generator;

control the first boost converter to convert the positive DC signal to generate the positive DC bus voltage;
control the second boost converter to convert the negative DC signal to generate the negative DC bus voltage; and
control the inverter circuit to convert the positive DC bus voltage and the negative DC bus voltage to the AC output signal.

15. The retrofit kit as defined in claim 14, wherein the control circuitry is configured to control the inverter circuit to control at least one of a frequency of the AC output signal or a voltage of the AC output signal.

16. The retrofit kit as defined in claim 14, further comprising a current sensor configured to monitor an output current of the AC output signal, and wherein the control circuitry is configured to control at least one of the first boost converter, the second boost converter, or the inverter circuit based on the output current.

17. The retrofit kit as defined in claim 14, further comprising a first voltage sensor configured to monitor a peak output voltage of the AC output signal, and wherein the control circuitry is configured to control at least one of the first boost converter, the second boost converter, or the inverter circuit based on the peak output voltage of the AC output signal.

18. The retrofit kit as defined in claim 17, further comprising a second voltage sensor configured to monitor at least one of the positive DC bus voltage or the negative DC bus voltage, and wherein the control circuitry is configured to control at least one of the first boost converter, the second boost converter, or the inverter circuit based on the at least one of the positive DC bus voltage or the negative DC bus voltage.

19. The retrofit kit as defined in claim 13, wherein the inverter circuit is configured to output the AC output signal to have a rated frequency over a range of generator speeds.

20. A method to supply AC output power to an AC load, the method comprising:
driving a variable-speed generator at a first speed;
rectifying an input voltage between a first winding of the generator and a reference tap of the first winding to output a first DC signal;
converting, via a first boost converter, the positive DC signal to generate a positive DC bus voltage with respect to the reference tap;
converting, via a second boost converter, a negative DC signal to generate a negative DC bus voltage with respect to the reference tap; and
converting, via an inverter circuit, the positive DC bus voltage and the negative DC bus voltage to an AC output signal with respect to the reference tap.

* * * * *